US012746769B2

(12) United States Patent
Nakazawa

(10) Patent No.: US 12,746,769 B2
(45) Date of Patent: Sep. 29, 2026

(54) LIQUID DISCHARGE APPARATUS

(71) Applicant: Yuuya Nakazawa, Kanagawa (JP)

(72) Inventor: Yuuya Nakazawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 129 days.

(21) Appl. No.: 18/732,702

(22) Filed: Jun. 4, 2024

(65) Prior Publication Data

US 2024/0408903 A1 Dec. 12, 2024

(30) Foreign Application Priority Data

Jun. 6, 2023 (JP) ................................ 2023-093142

(51) Int. Cl.

*B41J 25/304* (2006.01)
*B41J 2/165* (2006.01)
*B41J 25/308* (2006.01)
*B41J 25/316* (2006.01)

(52) U.S. Cl.

CPC ....... *B41J 25/3088* (2013.01); *B41J 2/16588* (2013.01)

(58) Field of Classification Search

CPC .. B41J 2202/20; B41J 2202/21; B41J 25/304; B41J 25/316

See application file for complete search history.

(56) References Cited

U.S. PATENT DOCUMENTS

2013/0100207 A1* 4/2013 Van Der Zwan ...... B41J 25/308 347/37
2022/0153044 A1 5/2022 Nakazawa

FOREIGN PATENT DOCUMENTS

JP 2009-274377 A 11/2009
JP 2017-209814 A 11/2017
JP 2021-045853 A 3/2021
JP 2022-079391 A 5/2022

* cited by examiner

*Primary Examiner* — Scott A Richmond
(74) *Attorney, Agent, or Firm* — XSENSUS LLP

(57) ABSTRACT

A liquid discharge apparatus includes a liquid discharge head, a lift, and a contact member. The liquid discharge head discharges a liquid in a discharge direction. The liquid discharge head is attached onto the head attachment. The lift moves the head attachment back and forth in the discharge direction and keeps an orientation of the head attachment in a plane orthogonal to the discharge direction. The contact member is disposed on a side face of the head attachment. The contact member faces the lift and has a space with the lift in a width direction orthogonal to the discharge direction. The contact member is contactable the lift in response to an inclination of the head attachment with respect to the plane.

20 Claims, 12 Drawing Sheets

FIG. 22 COMPARATIVE EXAMPLE
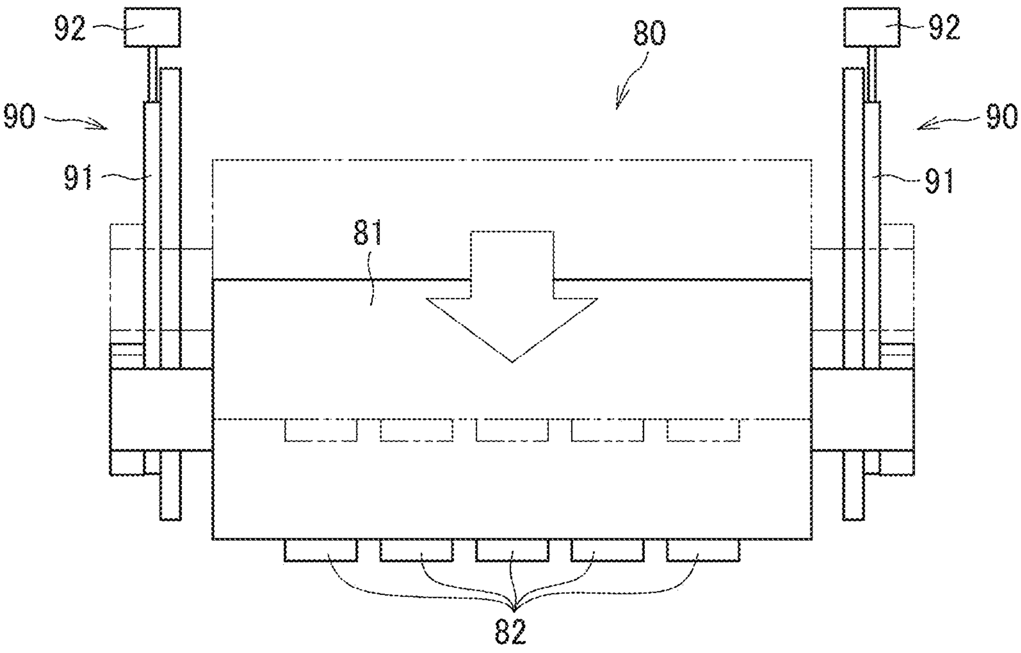
FIG. 23 COMPARATIVE EXAMPLE
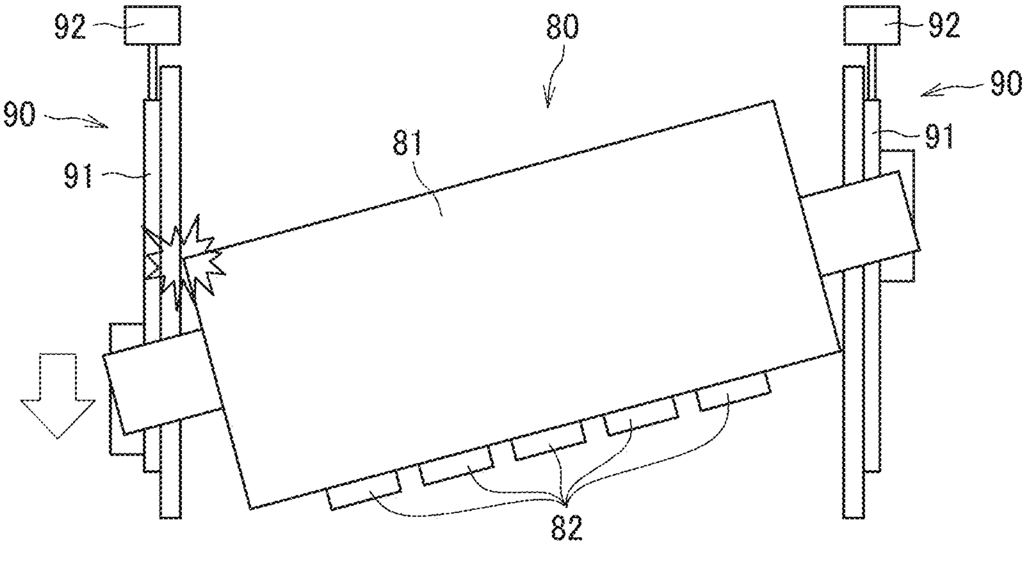

LIQUID DISCHARGE APPARATUS

CROSS-REFERENCE TO RELATED APPLICATION

This patent application is based on and claims priority pursuant to 35 U.S.C. § 119 (a) to Japanese Patent Application No. 2023-093142, filed on Jun. 6, 2023, in the Japan Patent Office, the entire disclosure of which is hereby incorporated by reference herein.

BACKGROUND

Technical Field

Embodiments of the present disclosure relate to a liquid discharge apparatus.

Related Art

An inkjet image forming apparatus is known as a liquid discharge apparatus that discharges a liquid onto a sheet to form an image. Such an image forming apparatus includes a lift to adjust the position of a liquid discharge head that discharges a liquid onto a sheet and to move the liquid discharge head to, for example, a maintenance position during maintenance.

SUMMARY

Embodiments of the present disclosure describe an improved liquid discharge apparatus that includes a liquid discharge head, a lift, and a contact member. The liquid discharge head discharges a liquid in a discharge direction. The liquid discharge head is attached onto the head attachment. The lift moves the head attachment back and forth in the discharge direction and keeps an orientation of the head attachment in a plane orthogonal to the discharge direction. The contact member is disposed on a side face of the head attachment. The contact member faces the lift and has a space with the lift in a width direction orthogonal to the discharge direction. The contact member is contactable the lift in response to an inclination of the head attachment with respect to the plane.

According to another embodiment of the present disclosure, there is provided a liquid discharge apparatus including a liquid discharge head, a lift, and an elastic member. The liquid discharge head discharges a liquid in a discharge direction. The liquid discharge head is attached onto the head attachment. The lift moves the head attachment back and forth in the discharge direction and keeps an orientation of the head attachment in a plane orthogonal to the discharge direction. The elastic member is elastically deformable in response to an inclination of the head attachment with respect to the plane.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 22 is a front view of a head module and a lift according to a comparative example; and FIG. 23 is a front view of the head module and the lift of FIG. 22 when the head attachment is inclined, according to the comparative example.

Figure 1:
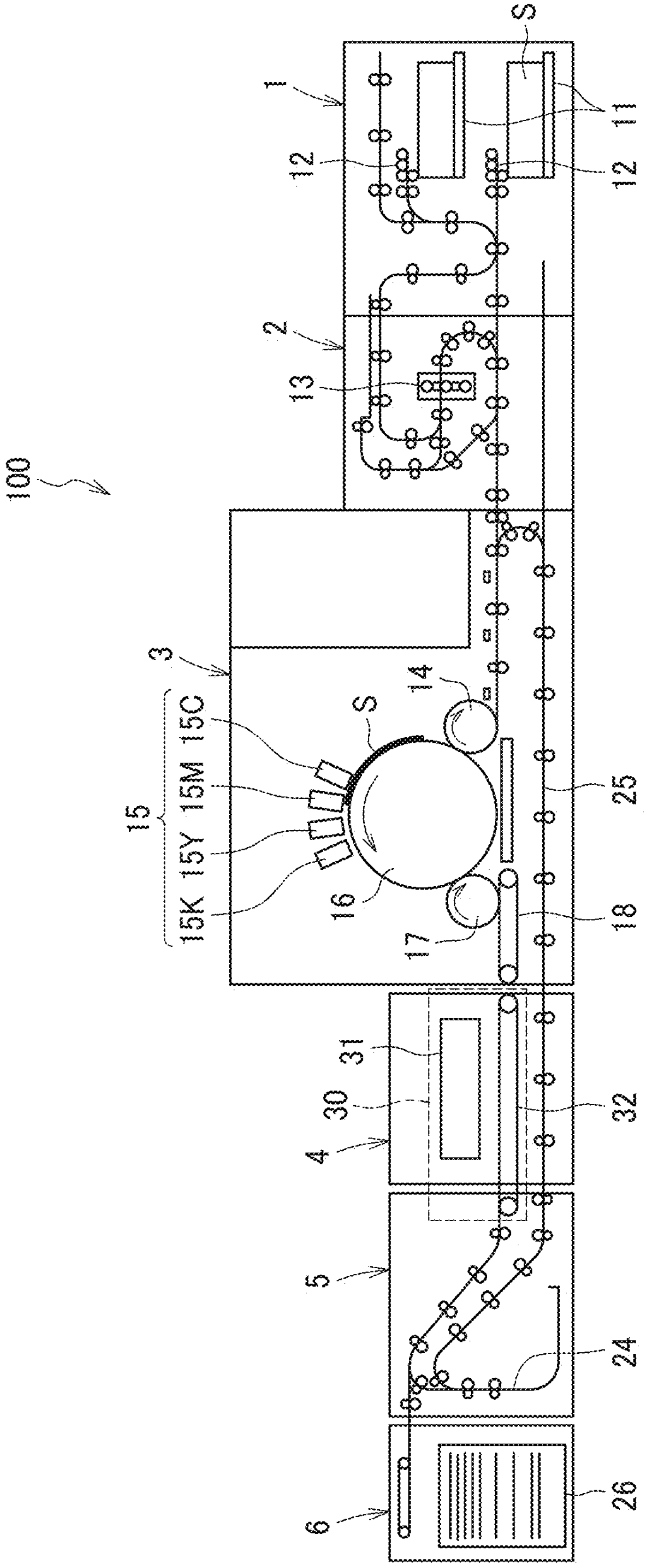
FIG. 1 is a diagram illustrating a configuration of a liquid discharge apparatus according to embodiments of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

With reference to the drawings attached, descriptions are given below of embodiments of the present disclosure. In the drawings for illustrating embodiments of the present disclosure, like reference signs are assigned to elements such as components and parts that have a like function or a like shape as far as distinguishable, and descriptions of such elements may be omitted once the description is provided.

Configuration of Liquid Discharge Apparatus

The configuration of a liquid discharge apparatus 100 according to an embodiment of the present disclosure is described below with reference to FIG. 1.

The liquid discharge apparatus 100 of FIG. 1 is an inkjet image forming apparatus that discharges liquid onto a sheet S to form an image. The liquid discharge apparatus 100 includes a sheet feeding device 1, a pretreatment device 2, an image forming device 3, a drying device 4, a reversing device 5, and a sheet output device 6.

The sheet feeding device 1 supplies the sheet S as a recording medium on which an image is to be formed. The sheet feeding device 1 includes a supply tray 11 on which multiple sheets S are accommodated, and a feeder 12 that separates and feeds the sheets S one by one from the supply tray 11. The sheet S fed by the feeder 12 is supplied to the pretreatment device 2.

The pretreatment device 2 applies a treatment liquid to the sheet S supplied from the sheet feeding device 1. The pretreatment device 2 includes a treatment-liquid coater 13 that applies the treatment liquid to the sheet S. For example, the treatment liquid has a function to coagulate ink and is applied by the treatment-liquid coater 13 onto the sheet S on which an image is not yet formed to prevent bleeding or feathering of ink or to assist permeation of ink. As a result, image quality can be enhanced. The sheet S onto which the treatment liquid is applied is conveyed to the image forming device 3.

The image forming device 3 forms an image on the sheet S. The image forming device 3 includes a liquid discharger 15, a first bearing rotator 14, a second bearing rotator 16, a third bearing rotator 17, and a first conveyance belt 18. The first bearing rotator 14, the second bearing rotator 16, and the third bearing rotator 17 rotate while bearing the sheet S on the respective outer circumferential surfaces to convey the sheet S. The sheet S conveyed from the pretreatment device 2 is borne on the first bearing rotator 14 and is transferred onto the second bearing rotator 16. The sheet S that is transferred onto the second bearing rotator 16 is transferred from the second bearing rotator 16 to the third bearing rotator 17. Subsequently, the sheet S is transferred from the third bearing rotator 17 to the first conveyance belt 18. The liquid discharger 15 includes multiple liquid discharge units 15C, 15M, 15Y, and 15K that discharge liquid ink onto the sheet S borne on the second bearing rotator 16. In the present embodiment, the liquid discharge unit 15C that discharges cyan ink, the liquid discharge unit 15M that discharges magenta ink, the liquid discharge unit 15Y that discharges yellow ink, and the liquid discharge unit 15K that discharges black ink are arranged in this order from upstream to downstream in the rotation direction of the second bearing rotator 16, i.e., a sheet conveyance direction of the sheet S. The arrangement of the liquid discharge units 15C, 15M, 15Y, and 15K is not limited to the order illustrated in FIG. 1, and the liquid discharge units 15C, 15M, 15Y, and 15K may be arranged in any order. In addition, a liquid discharge unit that discharges ink of a special color such as white, gold, or silver may be added if desired. When the sheet S is conveyed to positions facing each of the liquid discharge units 15C, 15M, 15Y, and 15K, ink is discharged from each of the liquid discharge units 15C, 15M, 15Y, and 15K to the sheet S. Thus, an image is formed on the sheet S.

The drying device 4 includes a heating unit 30 including a heater 31 and a second conveyance belt 32. The heater 31 heats the sheet S to dry the ink on the sheet S. The heater 31 may be a non-contact heater such as a hot-air generator or a high-frequency induction heater disposed in a non-contact manner with respect to the sheet S, or a contact heater such as a heating roller or a heating drum disposed in a contact manner with respect to the sheet S. The second conveyance belt 32 is disposed below the heater 31 to face the heater 31. After the sheet S is transferred from the first conveyance belt 18 to the second conveyance belt 32, the sheet S is conveyed by the second conveyance belt 32. When the sheet S is conveyed to a position facing the heater 31, the sheet S is heated by the heater 31, and drying of the ink on the sheet S is accelerated.

The reversing device 5 reverses the sheet S front and back, and conveys the sheet S to the image forming device 3 again when duplex printing is performed. Specifically, the reversing device 5 includes a switchback conveyor 24 and a return conveyor 25. When images are formed on both sides of the sheet S, after an image is formed on the front side of the sheet S in the image forming device 3, the sheet S passes through the drying device 4 and is conveyed to the reversing device 5. Subsequently, after the sheet S is conveyed in a reversed direction by the switchback conveyor 24, the sheet S is conveyed to a position upstream from the first bearing rotator 14 via the return conveyor 25. Accordingly, the sheet S is supplied to the image forming device 3 with the front and back sides of the sheet S reversed. After an image is formed on the back side of the sheet S in the image forming device 3, the sheet S is subjected to drying processing by the drying device 4 and is conveyed from the reversing device 5 to the sheet output device 6.

The sheet S after image formation is output into the sheet output device 6. The sheet output device 6 includes an output tray 26 on which the sheet S is placed. When the sheets S are ejected from the reversing device 5 into the sheet output device 6, the sheets S are sequentially stacked on the output tray 26.

Configuration of Discharge Unit

Figure 2:
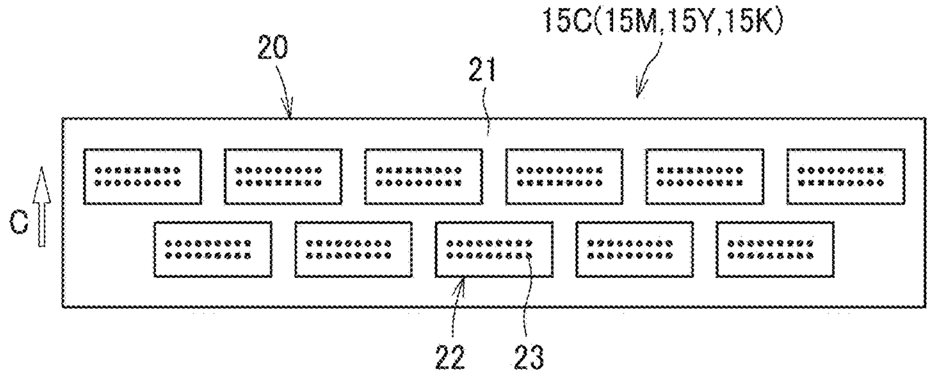
FIG. 2 is a diagram illustrating a configuration of a liquid discharge unit according to embodiments of the present disclosure.

FIG. 2 is a diagram illustrating a configuration of the liquid discharge units 15C, 15M, 15Y, and 15K according to the present embodiment.

As illustrated in FIG. 2, each of the liquid discharge units 15C, 15M, 15Y, and 15K includes a head module 20 including, for example, full-line type heads. The head module 20 includes a head attachment 21 having a rectangular parallelepiped shape and multiple liquid discharge heads 22 disposed in a staggered arrangement on the lower face of the head attachment 21. Each of the multiple liquid discharge heads 22 has multiple nozzle rows each including multiple nozzles 23 arranged in a sheet width direction, i.e., the lateral direction in FIG. 2, intersecting a sheet conveyance direction C in FIG. 2. When discharge driving of the liquid discharge units 15C, 15M, 15Y, and 15K is controlled by drive signals based on image data, ink is discharged from the nozzles 23 to the sheet S in a discharge direction, and an image corresponding to the image data is formed on the sheet S.

Configuration of Controller

Figure 3:
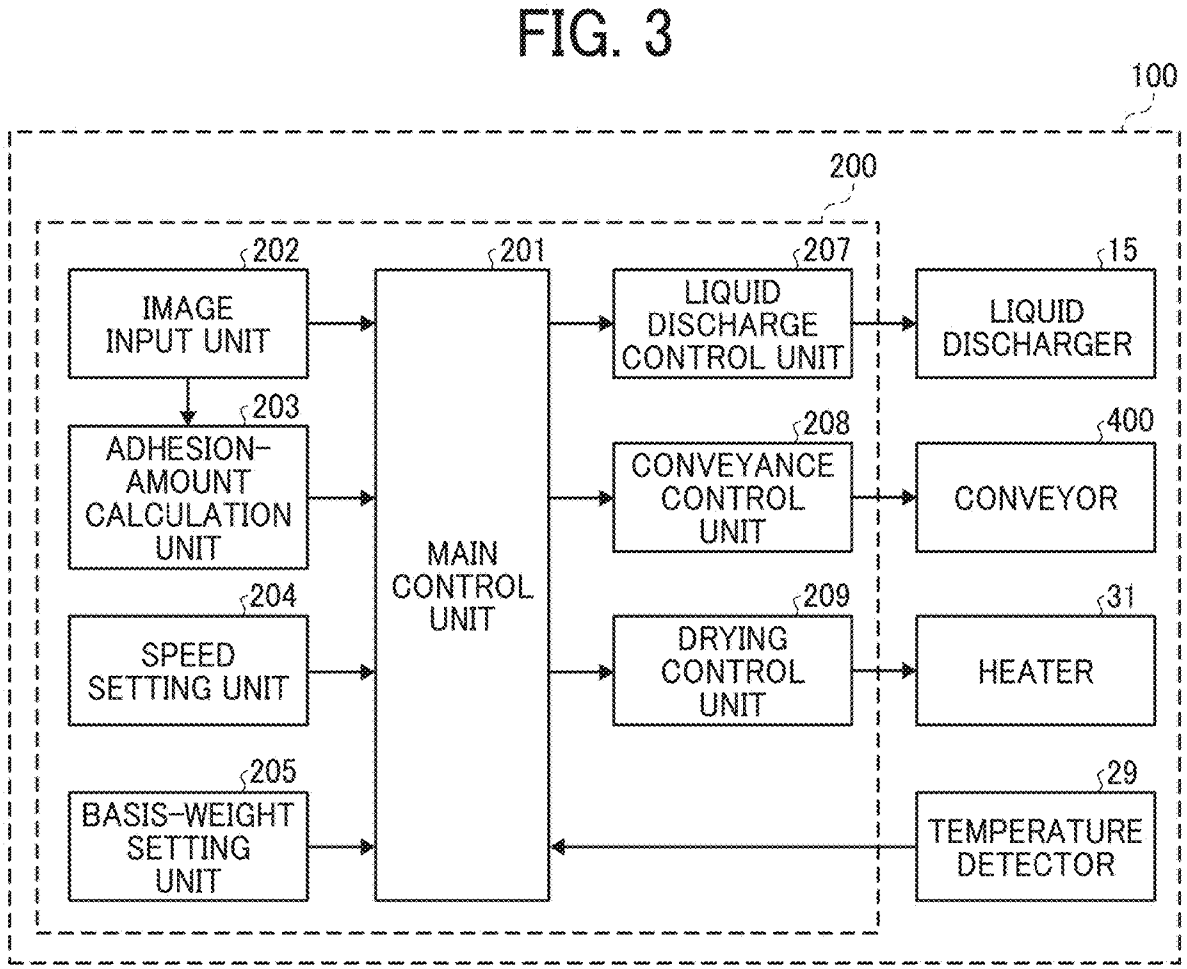
FIG. 3 is a block diagram illustrating a configuration of a controller according to embodiments of the present disclosure.

FIG. 3 is a block diagram illustrating the configuration of a controller according to the present embodiment.

As illustrated in FIG. 3, the liquid discharge apparatus 100 includes a controller 200 that controls various operations such as an image forming operation. Specifically, the controller 200 includes a main control unit 201, an image input unit 202, an adhesion-amount calculation unit 203, a speed setting unit 204, a basis-weight setting unit 205, a liquid discharge control unit 207, a conveyance control unit 208, and a drying control unit 209.

The main control unit 201 includes a central processing unit (CPU) that controls the overall operation of the liquid discharge apparatus 100, a read-only memory (ROM) that stores programs executed by the CPU and other fixed data, a random-access memory (RAM) that temporarily stores image data, and a rewritable non-volatile random-access memory (NVRAM) that retains data even while the power source of the liquid discharge apparatus 100 is cut off.

When the speed of the sheet is set by the speed setting unit 204, the main control unit 201 transmits a control signal to the conveyance control unit 208 based on data of the set speed. The conveyance control unit 208 obtains the control signal from the main control unit 201 and controls the conveyance operation of a conveyor 400 (e.g., the feeder 12, the first to third bearing rotators 14, 16, and 17 and the first and second conveyance belt 18 and 32). Thus, a sheet is conveyed at the set speed.

When image data to be printed is input to the image input unit 202, the main control unit 201 transmits a control signal to the liquid discharge control unit 207 based on the input image data. The liquid discharge control unit 207 obtains the control signal from the main control unit 201 and controls the discharge operation of the liquid discharger 15. Thus, the liquid is discharged from the liquid discharger 15, and an image corresponding to the image data is formed on the sheet.

The image data input to the image input unit 202 is also transmitted to the adhesion-amount calculation unit 203 in addition to the main control unit 201. The adhesion-amount calculation unit 203 calculates the adhesion amount of droplets of liquid for image formation based on the image data transmitted from the image input unit 202. The main control unit 201 transmits a control signal to the drying control unit 209 based on the adhesion amount of droplets obtained from the adhesion-amount calculation unit 203, the basis-weight of the sheet obtained from the basis-weight setting unit 205, and temperature data of the heater 31 obtained from a temperature detector 29. The drying control unit 209 obtains the control signal from the main control unit 201 and controls the heating temperature of the heater 31. Thus, the heater 31 is controlled to an appropriate heating temperature, and the drying process of the sheet is performed well.

Configuration of Lift

Figure 4:
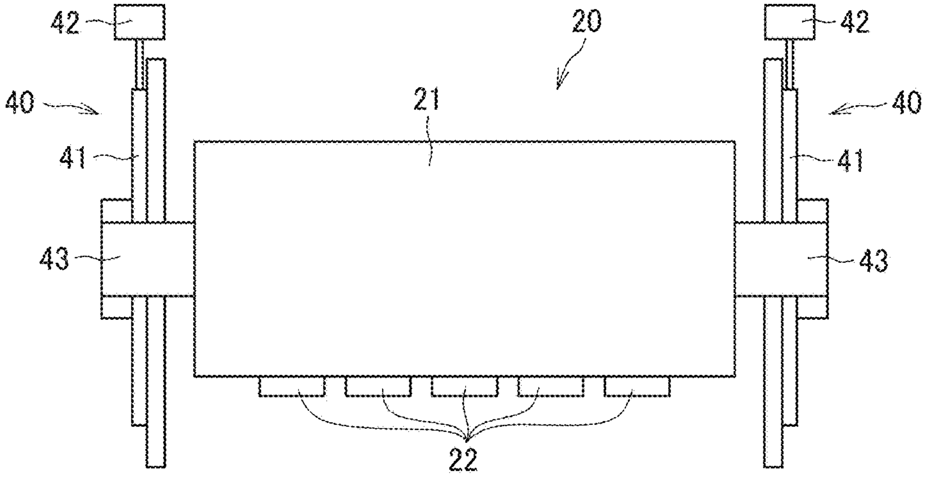
FIG. 4 is a front view of a head module and a lift according to a first embodiment of the present disclosure.
Figure 5:
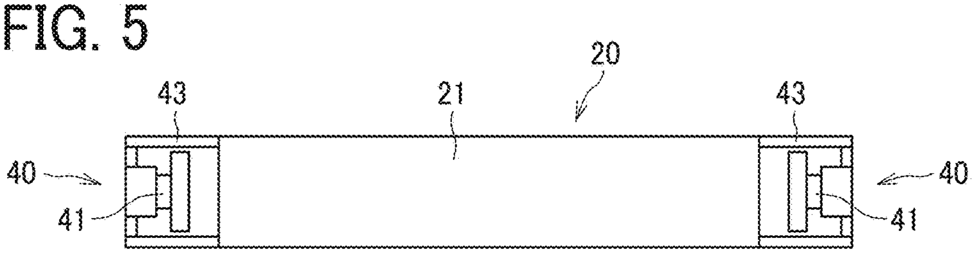
FIG. 5 is a plan view of the head module and the lift of FIG. 4, according to the first embodiment of the present disclosure.

The configuration of a lift 40 of the head module 20 according to a first embodiment of the present disclosure will be described below with reference to FIGS. 4 and 5. FIG. 4 is a front view of the head module 20 and the lift 40 according to the first embodiment of the present disclosure, and FIG. 5 is a plan view of the head module 20 and the lift 40 according to the first embodiment of the present disclosure. In FIGS. 4 and 5, a contact member which is described later is omitted for simplicity.

As illustrated in FIGS. 4 and 5, a pair of lifts 40 for lifting and lowering the head attachment 21 are disposed on both sides of the head module 20, respectively. Each of the pair of lifts 40 includes a ball screw 41 and an electric motor 42. The ball screw 41 is a motion converter that converts a rotational motion of the electric motor 42 into a linear motion, for example, in the vertical direction to move the head attachment 21 up and down. When the electric motor 42 is driven, a screw shaft of the ball screw 41 rotates, and a nut attached to the screw shaft moves linearly along the screw shaft. Since the nut is coupled to the head attachment 21 via a holder 43 that holds the head attachment 21, when the nut of each of the lifts 40 moves linearly along the screw shaft, the head attachment 21 moves together with the nut, and thus the head attachment 21 moves up or down in the vertical direction (i.e., the discharge direction in the present embodiment) while being held horizontally. To move the head attachment 21 up and down, a lead screw or other linear motion actuators may be used instead of the ball screw 41.

Figure 6:
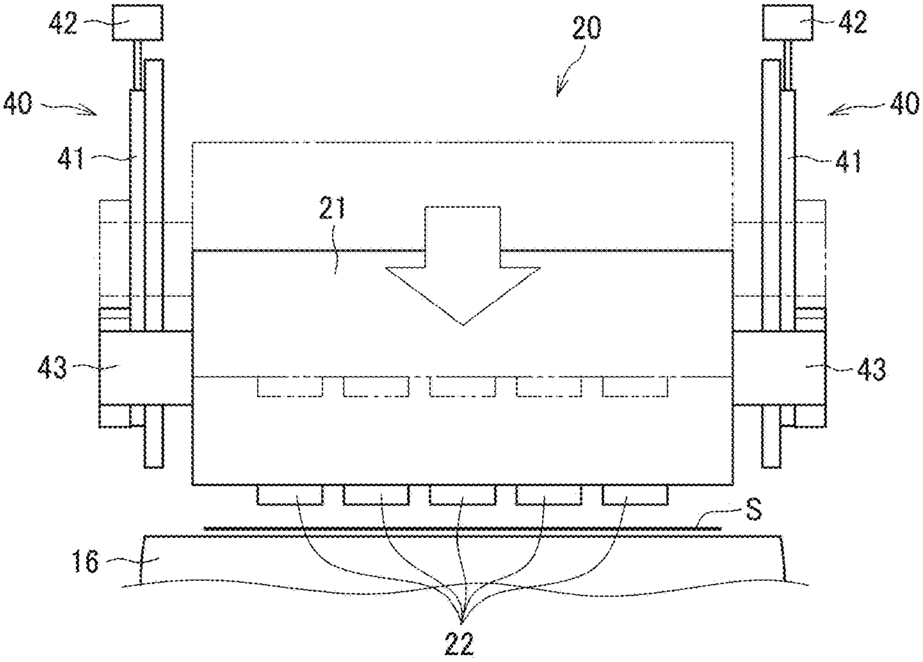
FIG. 6 is a front view of the head module and the lift of FIG. 4, illustrating the operation to lift and lower the head module (i.e., a lifting operation) during image formation.

FIG. 6 is a diagram illustrating the operation to lift and lower the head module 20 during image formation. In FIG. 6, the contact member which is described later is omitted for simplicity.

When image formation is performed, the lifts 40 are driven to move the head attachment 21 from a retracted position above the second bearing rotator 16 to an image forming position close to the second bearing rotator 16, as illustrated in FIG. 6. Thus, the liquid discharge head 22 is arranged at an optimum position (distance) with respect to the sheet S conveyed by the second bearing rotator 16, and the liquid discharge head 22 is ready for discharging liquid onto the sheet S to form an image.

Figure 7:
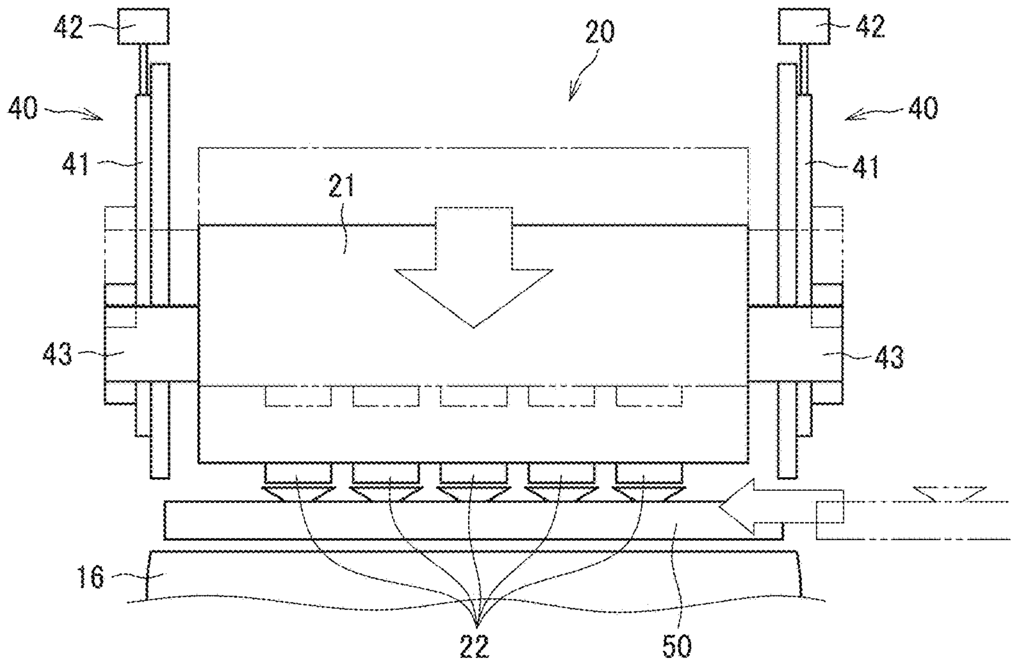
FIG. 7 is a front view of the head module and the lift of FIG. 4, illustrating the operation to lift and lower the head module during maintenance.

FIG. 7 is a diagram illustrating the operation to lift and lower the head module 20 during maintenance. In FIG. 7, the contact member which is described later is omitted for simplicity.

When a maintenance operation is performed, as illustrated in FIG. 7, a maintenance unit 50 moves in the horizontal direction and is arranged below the head module 20. At this time, to avoid collision of the maintenance unit 50 with the liquid discharge head 22, the head attachment 21 is temporarily lifted in accordance with the movement of the maintenance unit 50 to retreat from the maintenance unit 50. When the maintenance unit 50 is arranged below the head module 20, the head attachment 21 is lowered. Accordingly, the head module 20 is arranged at the maintenance position, and the maintenance operation in which the liquid discharge head 22 is moisturized or cleaned by the maintenance unit 50 can be performed. In addition, to move the head module 20 to the image forming position for the next image formation after the maintenance operation, the maintenance unit 50 moves in the horizontal direction to retreat from between the head module 20 and the second bearing rotator 16.

Lift and Head Module

A lift and a head module according to a comparative example different from the present embodiment will be described below.

FIG. 22 is a front view of a head module 80 and a lift 90 according to the comparative example.

As illustrated in FIG. 22, the head module 80 according to the comparative example includes a head attachment 81. Multiple liquid discharge heads 82 are attached to the lower face of the head attachment 81, similarly to the head module 20 according to the first embodiment of the present disclosure. A pair of lifts 90 for lifting and lowering the head attachment 81 are disposed on both sides of the head module 80, respectively. The lift 90 according to the comparative example includes a ball screw 91 and an electric motor 92, similarly to the lift 40 according to the first embodiment of the present disclosure. Accordingly, in the comparative example, the electric motors 92 of the pair of lifts 90 are driven and stopped at the same timing to move the head attachment 81 up and down while keeping the orientation of the head attachment 81 in the horizontal direction (i.e., on a plane orthogonal to the discharge direction).

However, as illustrated in FIG. 23, when an operation failure occurs in the right lift 90 in FIG. 23, the movement of the right end of the head attachment 81 does not follow the lifting operation of the left end in FIG. 23, and thus the head attachment 81 is inclined. As a result, if the head attachment 81 collides with the lift 90, components, such as a head substrate and a head substrate cooler, mounted on the head attachment 81 may be damaged or deformed. Further, if the lift 90 continues to be driven after the collision of the head attachment 81 and the head attachment 81 is further lowered, the liquid discharge head 82 may collide with a rotator for bearing a sheet or a maintenance unit, and components thereof may be damaged or deformed.

Further, if the lift 90 continues to be driven after the collision of the head attachment 81, the inclination of the head attachment 81 increases, and thus components holding the head attachment 81 may be damaged.

For this reason, in the first embodiment of the present disclosure, the following measures are taken to prevent the damage and deformation of the components due to the collision of the head attachment with the lift when the head attachment is inclined. The configuration of feature according to the first embodiment of the present disclosure will be described below.

Configuration of Feature

Figure 8:
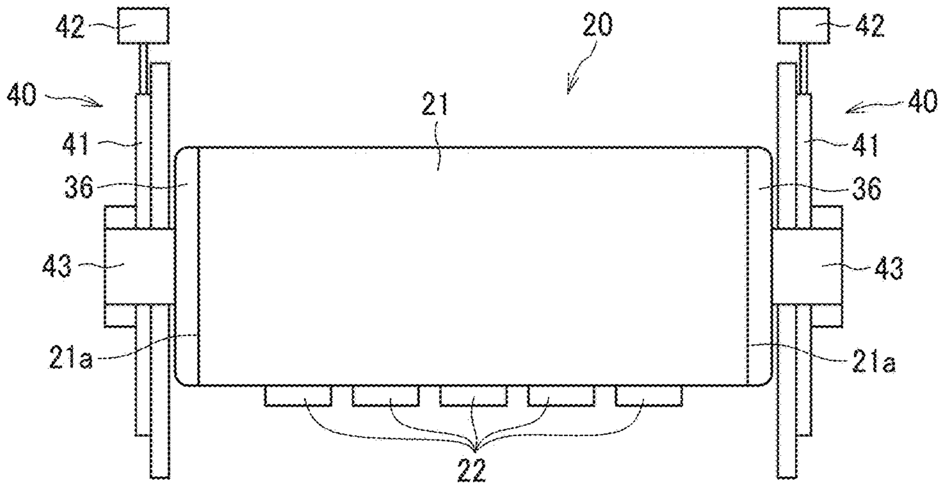
FIG. 8 is a front view of the head module and the lift according to the first embodiment of the present disclosure.
Figure 9:
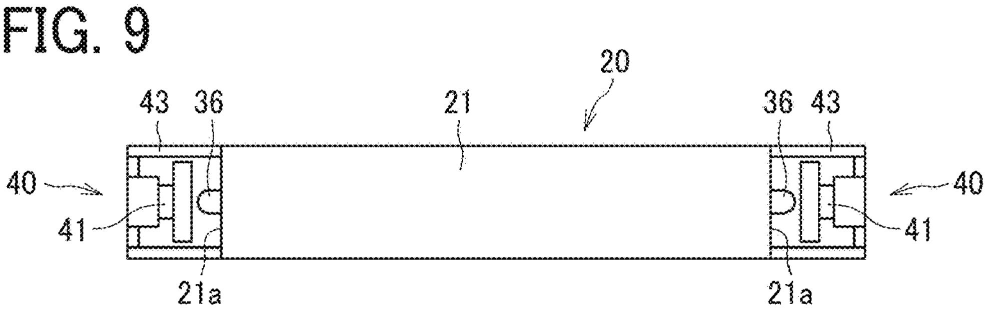
FIG. 9 is a plan view of the head module and the lift of FIG. 8, according to the first embodiment of the present disclosure.

FIG. 8 is a front view of the head module 20 and the lift 40, illustrating the configuration of feature according to the first embodiment of the present disclosure. FIG. 9 is a plan view of the head module 20 and the lift 40, illustrating the configuration of feature according to the first embodiment of the present disclosure.

As illustrated in FIGS. 8 and 9, in the first embodiment of the present disclosure, contact members 36 are disposed on both side faces 21*a* of the head attachment 21 facing the corresponding lifts 40, respectively. The contact members 36 extend continuously and linearly in the vertical direction and cover the entire vertical range of both the side faces 21*a* of the head attachment 21, respectively. Further, the contact members 36 project from both the side faces 21*a* of the head attachment 21 toward the corresponding lifts 40, respectively. The contact members 36 are spaced apart from the corresponding lifts 40, respectively, so as not to come into contact with the lifts 40 when the head attachment 21 is held horizontally.

Figure 10:
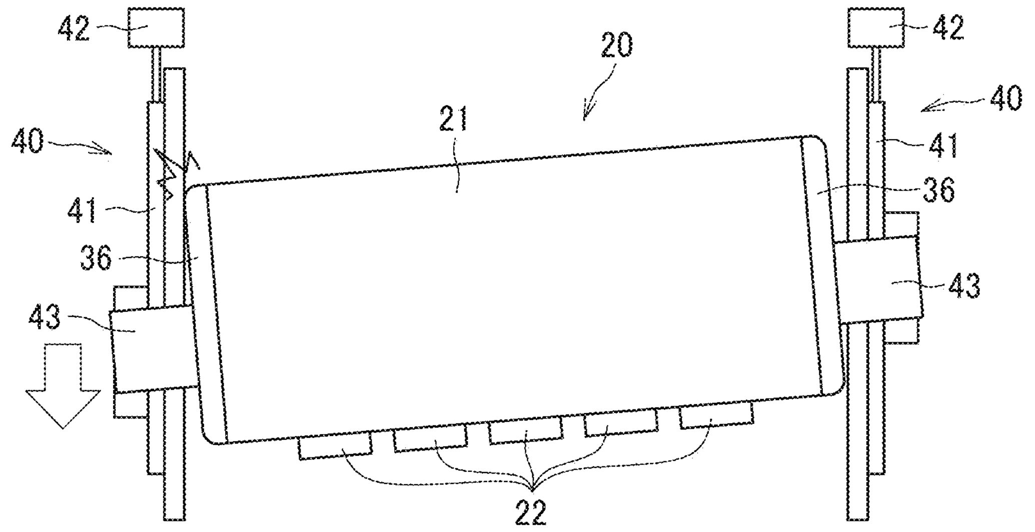
FIG. 10 is a front view of the head module and the lift of FIG. 8 in which a head attachment is inclined, according to the first embodiment of the present disclosure.

As described above, in the first embodiment of the present disclosure, since the contact members 36 are disposed on both the side faces 21*a* of the head attachment 21, at least one of the contact members 36 contacts the lift 40 when the head attachment 21 is inclined. For example, as illustrated in FIG. 10, when only the left side of the head attachment 21 is lowered and the head attachment 21 is inclined due to the operation failure of the right lift 40, the left contact member 36 contacts the lift 40. With such a configuration, the collision of the head attachment 21 with the lift 40 is avoided, and the damage and deformation of the components due to the collision are prevented.

When the contact member 36 contacts the lift 40, the lift 40 stops being driven. Specifically, in the first embodiment of the present disclosure, a stepping motor that rotates in synchronization with a pulse signal is used as the electric motor 42. When the contact member 36 contacts the lift 40, the synchronization between the pulse signal and the rotation of the stepping motor is lost due to the load of the contact. As a result, the stepping motor loses steps (steps out) and stops being driven. Accordingly, since the head attachment 21 does not continue to be lowered, the liquid discharge head 22 can avoid colliding with the second bearing rotator 16 or the maintenance unit 50.

As described above, according to the first embodiment of the present disclosure, even if the head attachment 21 is inclined, the contact member 36 contacts the lift 40, and thus the lifting operation can be stopped. Accordingly, the head attachment 21 is prevented from directly colliding with the lift 40, and the liquid discharge head 22 is prevented from colliding with the second bearing rotator 16. As a result, the damage and deformation of components can be prevented. The damage and deformation of the holder 43 holding the head attachment 21 can also be prevented. As a result, the reliability of the liquid discharge apparatus 100 is enhanced.

Figure 11:
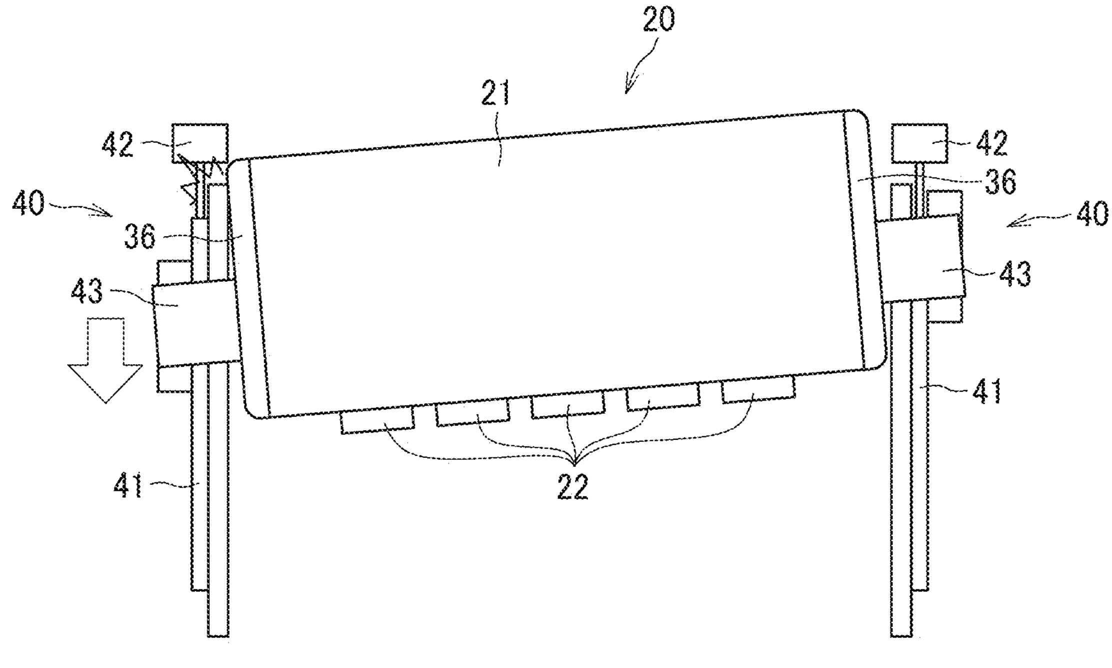
FIG. 11 is a front view of the head module and the lift of FIG. 8 in which the head attachment is inclined when the head attachment is positioned higher than the lift, according to the first embodiment of the present disclosure.

In the first embodiment of the present disclosure, since the contact member 36 covers the entire vertical range of the side face 21*a* of the head attachment 21, as illustrated in FIG. 11, even if the head attachment 21 is inclined when the head attachment 21 is positioned higher than the lift 40, the contact member 36 contacts the lift 40. Accordingly, the head attachment 21 can be protected over a wide range.

Figure 12:
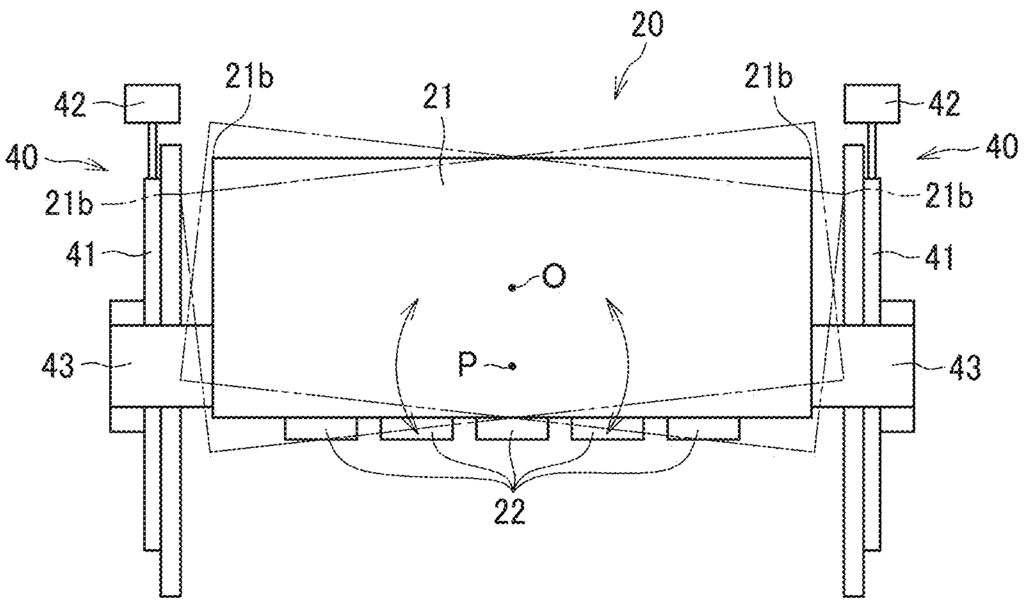
FIG. 12 is a front view of the head module and the lift, illustrating a portion of the head attachment to collide with the lift when the center of the head attachment is disposed at a position different from the rotation center of the head attachment, according to the first embodiment of the present disclosure.
Figure 13:
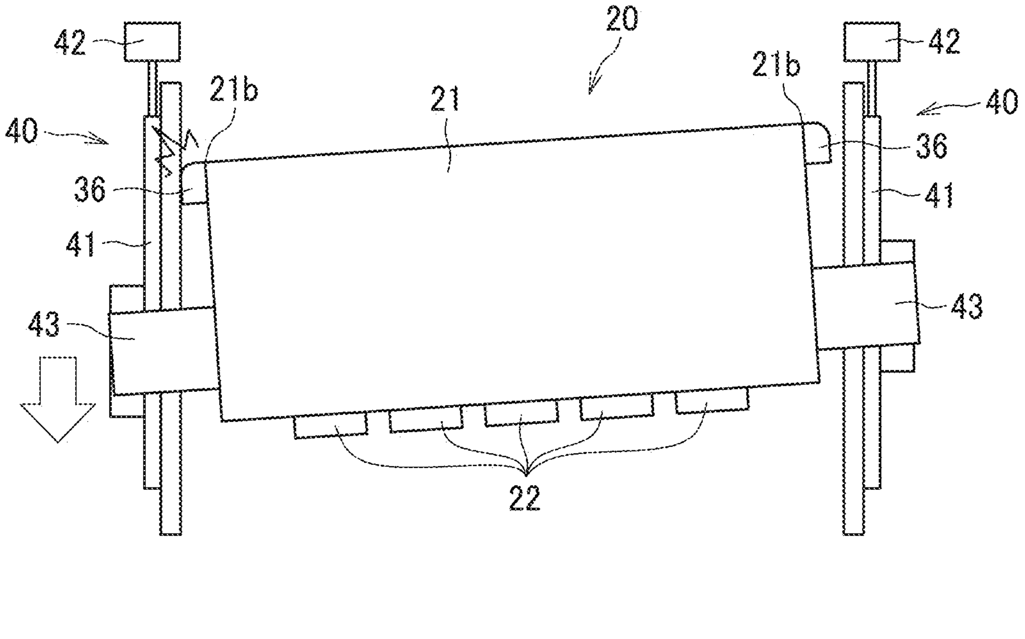
FIG. 13 is a front view of a head module in which a contact member is disposed only at the upper end of the head attachment and in the vicinity thereof, according to the first embodiment of the present disclosure.

As described above, the contact member 36 covers the entire vertical range of the side face 21*a*, but is not limited thereto. Alternatively, the contact member 36 may cover a part of the vertical range of the side face 21*a*. For example, as illustrated in FIG. 12, when the center O of the head attachment 21 is located above the rotation center P of the inclination of the head attachment 21, an upper end 21*b* of the head attachment 21 is likely to collide with the lift 40. For this reason, as illustrated in FIG. 13, the contact member 36 may be disposed only on the upper end 21*b*, which is likely to collide with the lift 40, and the vicinity thereof. On the other hand, when the center O of the head attachment 21 is located below the rotation center P of the inclination of the head attachment 21, the lower end of the head attachment 21 is likely to collide with the lift 40. For this reason, the contact member 36 is preferably disposed only on the lower end, which is likely to collide with the lift 40, and the vicinity thereof. Thus, since the contact member 36 is disposed only at a portion of the head attachment 21 which is likely to collide with the lift 40, the head attachment 21 can effectively avoid colliding with the lift 40. As a result, the size of the contact member 36 can be decreased to reduce the cost.

Figure 14:
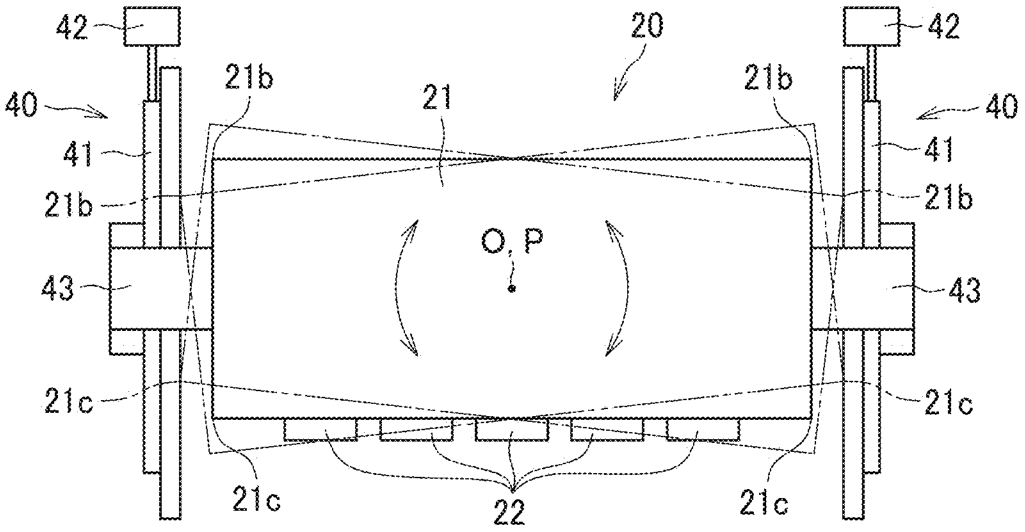
FIG. 14 is a front view of the head module and the lift, illustrating a portion of the head attachment to collide with the lift when the center of the head attachment is disposed at the same position as the rotation center of the head attachment, according to the first embodiment of the present disclosure.
Figure 15:
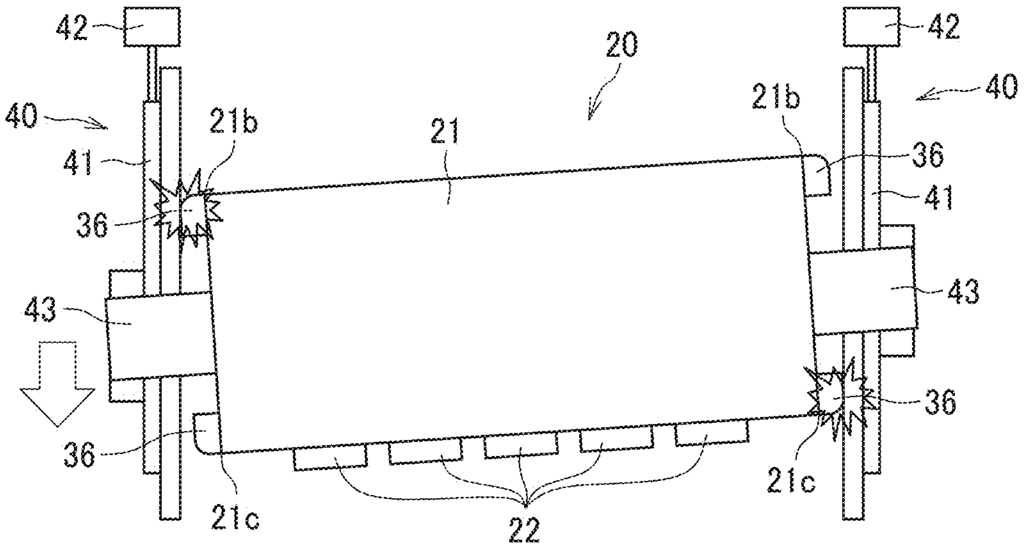
FIG. 15 is a front view of a head module in which contact members are disposed only at the upper and lower ends of the head attachment and in the vicinity thereof, according to the first embodiment of the present disclosure.

Further, as illustrated in FIG. 14, when the center O of the head attachment 21 is located at the same position as the rotation center P of the inclination of the head attachment 21, both the upper end 21*b* and a lower end 21*c* of the head attachment 21 are likely to collide with the lift 40 when the head attachment 21 is inclined. Accordingly, in this case, as illustrated in FIG. 15, the contact members 36 are disposed only on the upper end 21*b* and the lower end 21*c* of the head attachment 21 and in the vicinity thereof. Thus, the head attachment 21 can effectively avoid colliding with the lift 40. In this case, since both of the two contact members 36 disposed on the upper end 21*b* and the lower end 21*c* contact the lift 40, the impact generated on each contact member 36 is reduced. Such a configuration also reduces the impact generated on the head attachment 21. Thus, the damage and deformation of the components mounted on the head attachment 21 can be effectively prevented. In the above description, the contact member 36 is omitted for simplicity in FIGS. 12 and 14.

When the head attachment 21 is inclined, a load is applied to the holder 43 holding the head attachment 21, or the holder 43 is deformed. Accordingly, the holder 43 may be damaged. To prevent such damage to the holder 43, the inclination angle of the head attachment 21 is preferably reduced.

Figure 16A:
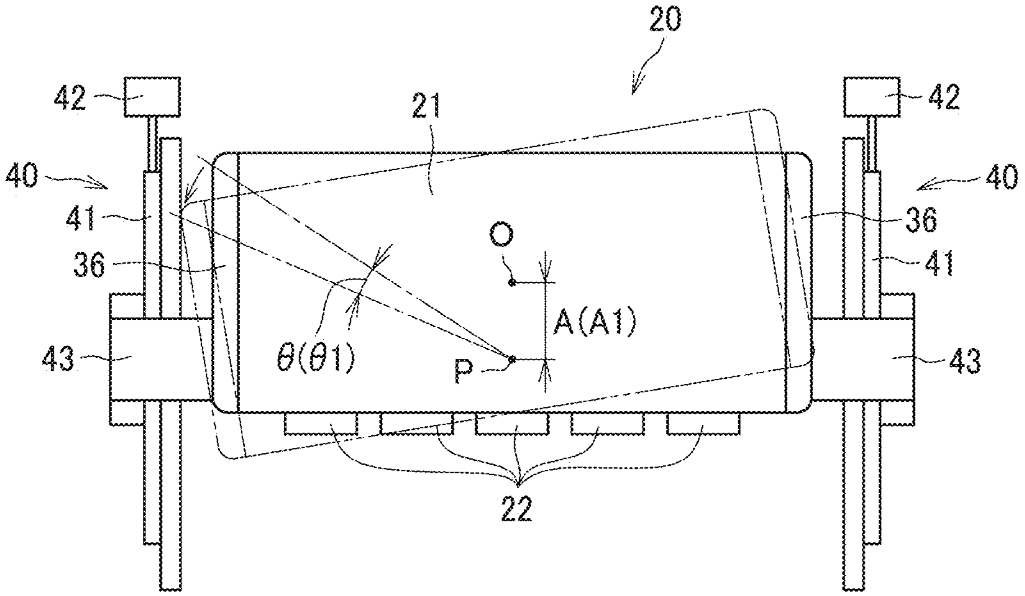
FIGS. 16A and 16B are front views of the head module, illustrating the relationship between the distance between the center and the rotation center of the head attachment and the inclination angle of the head attachment, according to the first embodiment of the present disclosure.
Figure 16B:
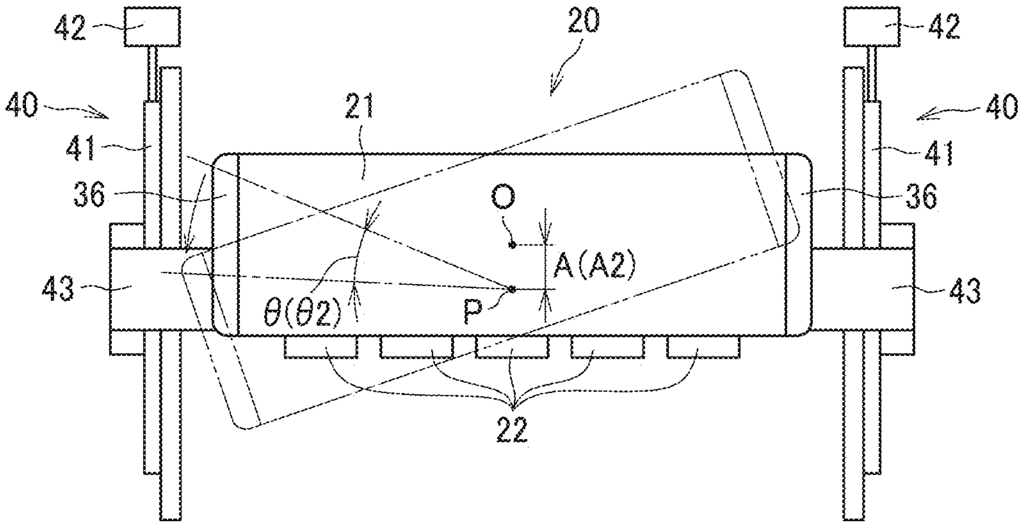

One of methods for reducing the inclination angle of the head attachment 21 is to increase a distance A between the center O and the rotation center P of the head attachment 21 illustrated in FIGS. 16A and 16B. When the distance A between the center O and the rotation center P of the head attachment 21 is large (distance A1 in FIG. 16A), the contact member 36 contacts the lift 40 with a smaller rotation amount of the head attachment 21 than when the distance A between the center O and the rotation center P of the head attachment 21 is small (distance A2 in FIG. 16B). As a result, the inclination angle θ of the head attachment 21 is smaller with the distance A1 than with the distance A2 ($\theta 1 < \theta 2$).

Figure 17A:
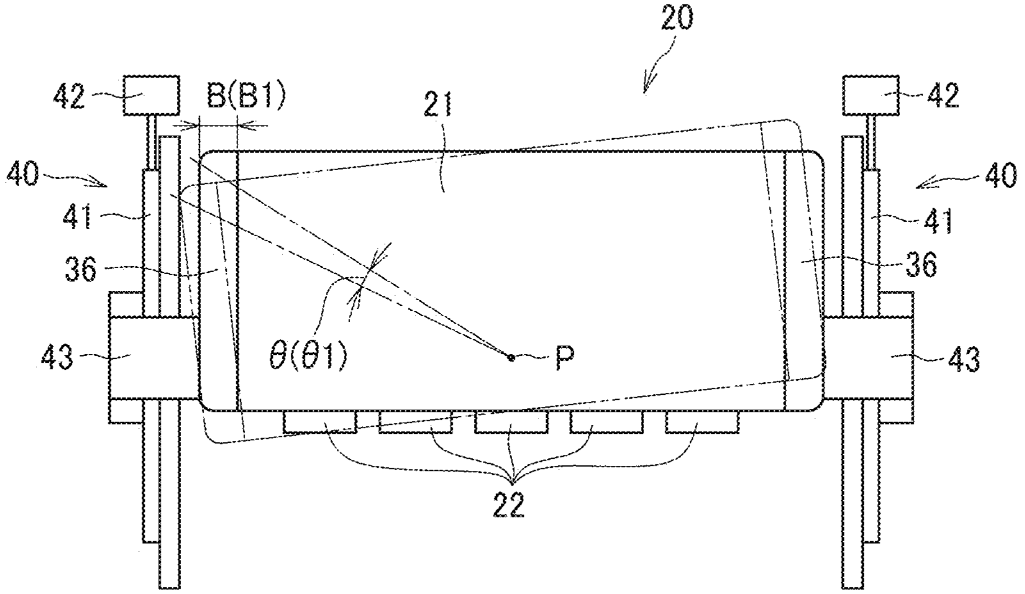
FIGS. 17A and 17B are front views of the head module, illustrating the relationship between the projecting amount of the contact member and the inclination angle of the head attachment, according to the first embodiment of the present disclosure.
Figure 17B:
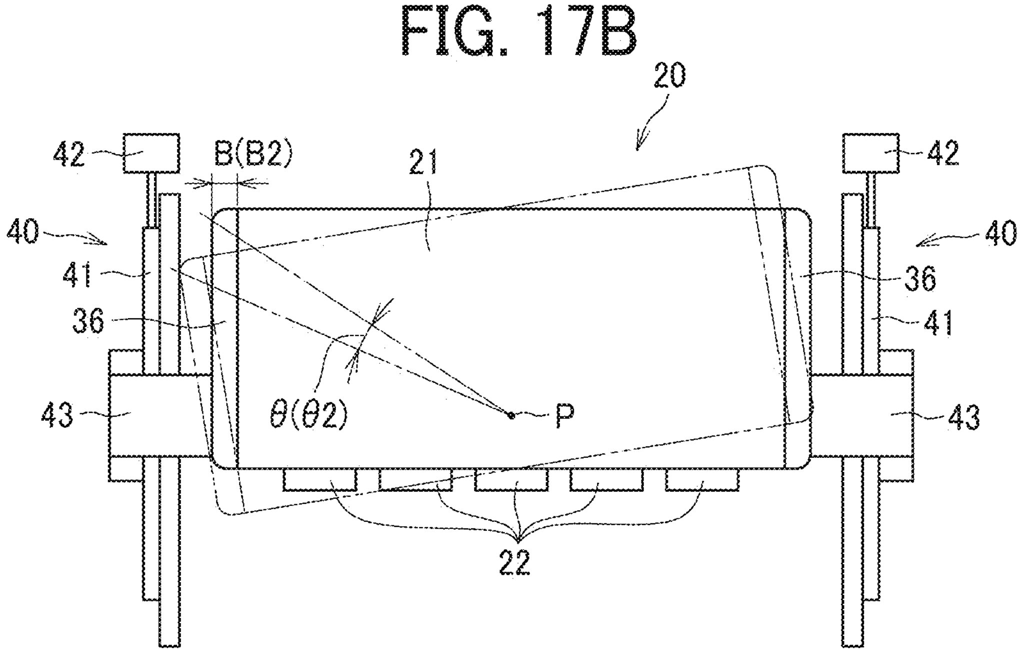

Further, the inclination angle of the head attachment 21 can be reduced by increasing the projecting amount B of the contact member 36 projecting from the head attachment 21 illustrated in FIGS. 17A and 17B. When the projecting amount B of the contact member 36 is large (projecting amount B1 in FIG. 17A), the contact member 36 contacts the lift 40 with a smaller rotation amount of the head attachment 21 than when the projecting amount B of the contact member 36 is small (projecting amount B2 in FIG. 17B). As a result, the inclination angle θ of the head attachment 21 is smaller with the projecting amount B1 than with the projecting amount B2 ($\theta 1 < \theta 2$).

Accordingly, by adjusting the distance A between the center O and the rotation center P of the head attachment 21, the projecting amount B of the contact member 36, or both of them, the inclination angle θ of the head attachment 21 can be reduced, and the deformation of the holder 43 can be reduced within the allowable range. Preferably, the projecting amount B of the contact member 36 is appropriately set according to the distance A between the center O and the rotation center P of the head attachment 21 so that the deformation of the holder 43 is within an allowable range.

The contact member 36 is preferably made of a material having a high friction coefficient, such as a rubber material. The contact member 36 formed of the material having the high friction coefficient increases the resistance force when the contact member 36 contacts the lift 40 to reliably cause the stepping motor to lose steps and stop being driven. To increase the resistance force when the contact member 36 contacts the lift 40, the surface roughness of the contact member 36 may be increased. For the same reason, the friction coefficient or the surface roughness of the portion of the lift 40 that the contact member 36 contacts may be increased.

Figure 18:
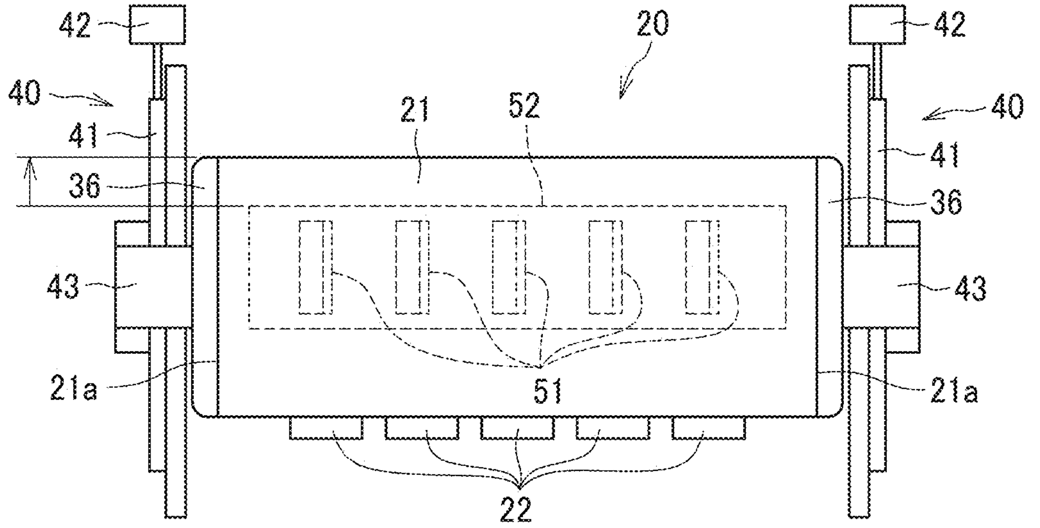
FIG. 18 is a front view of the head module, illustrating a positional relationship among the contact member, a head substrate, and a head substrate cooler, according to the first embodiment of the present disclosure.
Figure 19:
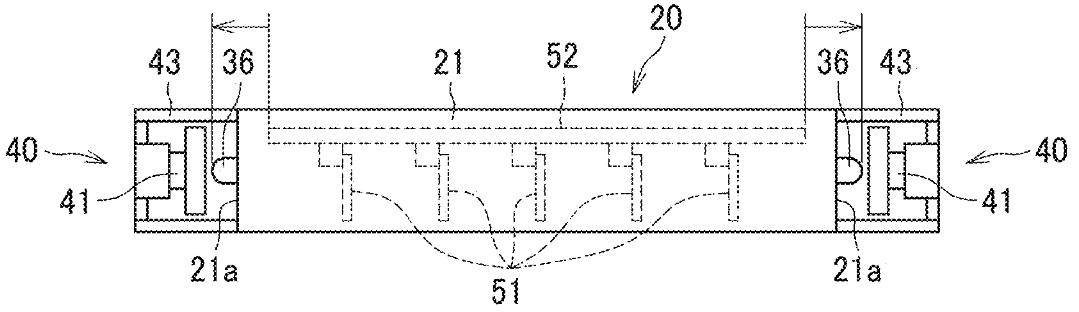
FIG. 19 is a plan view of the head module of FIG. 18, illustrating the positional relationship among the contact member, the head substrate, and the head substrate cooler, according to the first embodiment of the present disclosure.

As illustrated in FIGS. 18 and 19, a head substrate 51 and a head substrate cooler 52 in contact with the head substrate 51 are mounted in the head attachment 21. To prevent the damage or deformation of the head substrate 51 and the head substrate cooler 52 when the contact member 36 of the head attachment 21 collides with the lift 40, as illustrated in FIGS. 18 and 19, the contact member 36 preferably projects toward the lift 40 relative to the head substrate 51 and the head substrate cooler 52, and extends higher than the head substrate 51 and the head substrate cooler 52.

Another Embodiment

Another embodiment different from the first embodiment of the present disclosure is described below. Portions different from the first embodiment of the present disclosure are mainly described, and descriptions of like portions are appropriately omitted.

Figure 20:
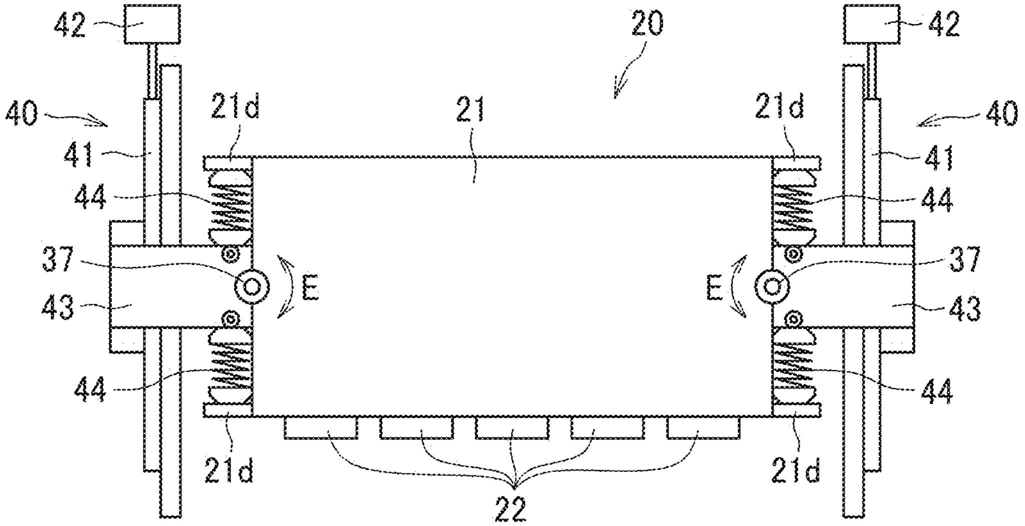
FIG. 20 is a front view of a head module and a lift according to a second embodiment of the present disclosure.

FIG. 20 is a front view of a head module and a lift according to a second embodiment of the present disclosure.

As illustrated in FIG. 20, in the second embodiment of the present disclosure, multiple elastic members 44 are disposed at each of both ends of the head attachment 21 facing the corresponding lift 40. In the present embodiment, a spring such as a coil spring is used as the clastic member 44. Alternatively, a rubber may be used as the elastic member 44. Each of the elastic members 44 is disposed between each projection 21*d* and the holder 43 holding the head attachment 21. The projections 21*d* project from the upper end and the lower end of the head attachment 21 on the left and right sides toward the lift 40. Thus, the elastic members 44 sandwich the holder 43 in the vertical direction on each of the left and right sides. When the head attachment 21 is held horizontally, the elastic forces of the elastic members 44 are balanced with each other.

In the second embodiment of the present disclosure, each holder 43 is coupled to the head attachment 21 via a rotation shaft 37. The rotation shaft 37 rotates about an axis extending in the direction perpendicular the surface of the paper on which FIG. 20 is drawn. Accordingly, the holder 43 and the head attachment 21 are coupled to each other so as to be rotatable relative to each other in the direction indicated by arrow E in FIG. 20.

Figure 21:
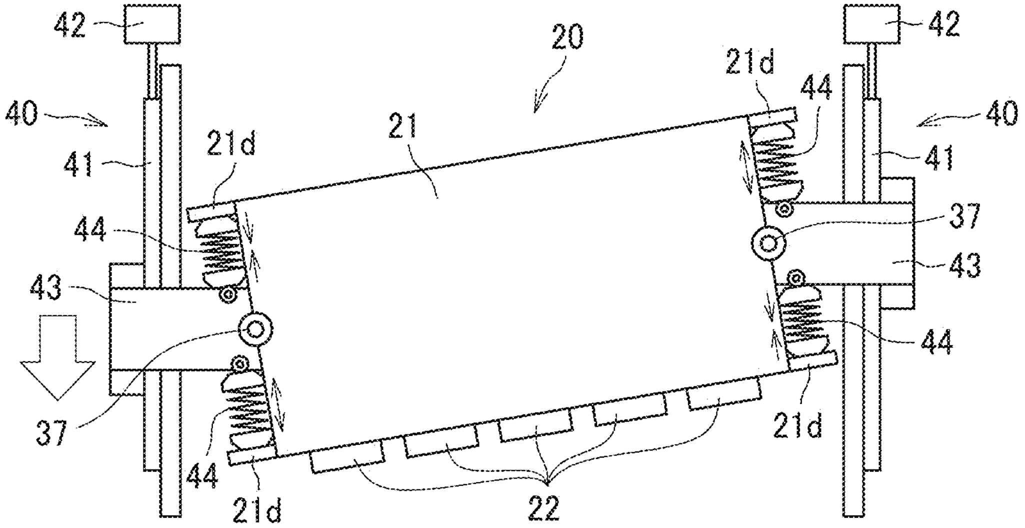
FIG. 21 is a front view of the head module and the lift of FIG. 20 when the head attachment is inclined according to the second embodiment of the present disclosure.

FIG. 21 is a front view of the head attachment 21 inclined in the second embodiment of the present disclosure.

As illustrated in FIG. 21, when the head attachment 21 is inclined as a result of the operation failure of the right lift 40, the elastic members 44 are compressed or extended in accordance with the inclination of the head attachment 21. Specifically, when the head attachment 21 is inclined, the head attachment 21 rotates about the rotation shaft 37 in accordance with the inclination, and the distances between the upper and lower projections 21*d* and the holder 43 changes. Thus, each elastic member 44 is compressed or extended. In the example illustrated in FIG. 21, when the head attachment 21 is inclined, the clastic members 44 on the upper right side and the lower left side are extended, and the clastic members 44 on the upper left side and the lower right side are compressed.

When each clastic member 44 is compressed or extended, an elastic resilience is generated to return the elastic member 44 to the original balanced state, and thus a force in a direction opposite to the direction of the inclination of the head attachment 21 is generated. As a result, the subsequent lifting operation is restricted. Specifically, in the example illustrated in FIG. 21, since a force for returning the head attachment 21 to the horizontal orientation acts on the head attachment 21 due to the elastic resilience of the elastic members 44, the lowering operation of the left side of the head attachment 21 is restricted. As a result, a load is applied to the stepping motor of the left lift 40 in FIG. 21, and the stepping motor loses steps. As a result, the stepping motor stops to be driven.

As described above, in the second embodiment of the present disclosure, even if the head attachment 21 is inclined, the clastic member 44 is elastically deformed, and thus the lifting operation of the lift 40 is stopped. Accordingly, since the liquid discharge head 22 can avoid colliding with the second bearing rotator 16 or the maintenance unit 50, the damage and deformation of components due to the collision of the liquid discharge head 22 can be prevented. In the second embodiment of the present disclosure, the lifting operation can be stopped without the contact member 36 described in the first embodiment, and thus the impact of contact of the contact member 36 can also be avoided. As a result, the damage and deformation of the components mounted on the head attachment 21 can be prevented more effectively.

Various embodiments of the present disclosure have been described above.

The "liquid discharge apparatus" according to embodiments of the present disclosure includes various liquid discharge apparatuses as long as the liquid discharge apparatus includes a liquid discharge unit and discharges liquid onto a sheet by driving the liquid discharge unit, in addition to the inkjet image forming apparatus as an example of the liquid discharge apparatus. The "liquid discharge apparatus" according to embodiments of the present disclosure is not limited to an apparatus that discharges liquid to visualize meaningful images such as characters or figures. For example, the "liquid discharge apparatus" may be an apparatus that forms patterns having no meaning or an apparatus that fabricates three-dimensional images. The "liquid discharge apparatus" further includes, for example, a treatment-liquid discharge apparatus that discharges treatment liquid onto the surface of a sheet for the purposes of, for example, reforming the surface of the sheet.

The "liquid discharge apparatus" according to embodiments of the present disclosure may include an aftertreatment device in addition to a device relating to feeding, conveying, and ejecting of a sheet and a pretreatment device. In the "liquid discharge apparatus" according to embodiments of the present disclosure, the liquid discharge unit may move relative to the sheet, or may not move relative to the sheet. For example, the "liquid discharge apparatus" may be a serial liquid discharge apparatus that moves the liquid discharge head (unit) or a line liquid discharge apparatus that does not move the liquid discharge head (unit).

The "sheet" onto which liquid is discharged is an object onto which liquid is at least temporarily adhered, and includes, for example, a sheet to which liquid is adhered and fixed and a sheet to which liquid adheres and permeates. Specific examples of the sheet include a recording medium such as a sheet of paper, a recording sheet, a film, and cloth, and an electronic substrate. Examples of the material of the "sheet" include any materials to which liquid can adhere even temporarily, such as paper, thread, fiber, fabric, leather, metal, plastic, glass, wood, and ceramic. The "sheet" may be a sheet (e.g., cut sheet) cut into a predetermined size in the sheet conveyance direction in advance, or a long sheet (e.g., roll paper) wound in a roll shape.

The "liquid" to be discharged from the "liquid discharge apparatus" according to embodiments of the present disclosure is not limited to a particular liquid as long as the liquid has a viscosity or surface tension to be discharged from a liquid discharge unit (liquid discharge head). However, preferably, the viscosity of the liquid is not greater than 30 millipascal-second (mPa·s) under ordinary temperature and ordinary pressure or by heating or cooling. Specifically, examples of the liquid include a solution, a suspension, or an emulsion that contains, for example, a solvent, such as water or an organic solvent; a colorant, such as dye or pigment; a functional material, such as a polymerizable compound, a resin, or a surfactant; a biocompatible material, such as deoxyribonucleic acid (DNA), amino acid, protein, or calcium; or an edible material, such as a natural colorant. Such a solution, a suspension, or an emulsion can be used for, e.g., inkjet ink, surface treatment solution, a liquid for forming components of electronic element or light-emitting element or a resist pattern of electronic circuit, or a material solution for three-dimensional fabrication.

The above-described embodiments of the present disclosure have at least the following aspects.

Aspect 1

A liquid discharge apparatus includes a liquid discharge head to discharge a liquid, a head attachment to which the liquid discharge head is attached, a lift to lift and lower the head attachment, and a contact member disposed on a side face of the head attachment facing the lift. The contact member contacts the lift when the head attachment is inclined. A lifting operation of the lift is stopped by the contact member contacting the lift.

In other words, a liquid discharge apparatus includes a liquid discharge head, a lift, and a contact member. The liquid discharge head discharges a liquid in a discharge direction. The liquid discharge head is attached onto the head attachment. The lift moves the head attachment back and forth in the discharge direction and keeps an orientation of the head attachment in a plane orthogonal to the discharge direction. The contact member is disposed on a side face of the head attachment. The contact member faces the lift and has a space with the lift in a width direction orthogonal to the discharge direction. The contact member is contactable the lift in response to an inclination of the head attachment with respect to the plane.

Aspect 2

In the liquid discharge apparatus according to Aspect 1, the contact member projects toward the lift further than the head attachment.

In other words, the contact member projects from the side face of the head attachment toward the lift in the width direction.

Aspect 3

In the liquid discharge apparatus according to Aspect 1 or 2, the contact member is disposed at least over the entire vertical range of the side wall of the head attachment.

In other words, the contact member extends and covers at least a part of the side face of the head attachment in the discharge direction.

Aspect 4

In the liquid discharge apparatus according to any one of Aspects 1 to 3, the contact member is formed in a linear shape extending in the vertical direction.

In other words, the contact member has a linear shape extending in the discharge direction.

Aspect 5

In the liquid discharge apparatus according to any one of Aspects 1 to 4, a projecting amount of the contact member projecting from the head attachment is set such that deformation of a holder that holds the head attachment is within an allowable range in a case where the head attachment is inclined and the contact member contacts the lift.

In other words, the liquid discharge apparatus according to any one of Aspects 1 to 4, further includes a holder holding the head attachment. The contact member projects from the side face of the head attachment toward the lift by a projecting amount. The contact member contacting the lift restricts deformation of the holder within an allowable range in response to the inclination of the head attachment with respect to the plane.

Aspect 6

In the liquid discharge apparatus according to any one of Aspects 1 to 5, a center of the head attachment is disposed at a position different from a rotation center when the head attachment is inclined.

In other words, a center of the head attachment is located at a position different from a rotation center of inclination of the head attachment.

Aspect 7

In the liquid discharge apparatus according to any one of Aspects 1 to 5, a center of the head attachment is disposed at the same position as a rotation center when the head attachment is inclined.

In other words, a center of the head attachment is located at the same position as a rotation center of inclination of the head attachment.

Aspect 8

In the liquid discharge apparatus according to any one of Aspects 1 to 7, the lift includes a stepping motor that applies a driving force for lifting and lowering the head attachment. The stepping motor loses steps and stops being driven when the contact member contacts the lift.

In other words, the lift includes a stepping motor to move the head attachment back and forth in the discharge direction. The contact member contacting the lift causes the stepping motor to lose steps and stop being driven.

Aspect 9

A liquid discharge apparatus includes a liquid discharge head to discharge a liquid, a head attachment to which the liquid discharge head is attached, a lift to lift and lower the head attachment, and an elastic member that is elastically deformed when the head attachment is inclined. The lifting operation of the lift is stopped by the elastic member elastically deformed.

In other words, a liquid discharge apparatus includes a liquid discharge head, a lift, and an elastic member. The liquid discharge head discharges a liquid in a discharge direction. The liquid discharge head is attached onto the head attachment. The lift moves the head attachment back and forth in the discharge direction and keeps an orientation of the head attachment in a plane orthogonal to the discharge direction. The elastic member is elastically deformable in response to an inclination of the head attachment with respect to the plane.

Aspect 10

In the liquid discharge apparatus according to Aspect 9, the lift includes a stepping motor that applies a driving force for lifting and lowering the head attachment. The stepping motor loses steps and stops being driven when the elastic member is elastically deformed.

In other words, the lift includes a stepping motor to move the head attachment back and forth in the discharge direction. The elastic member elastically deformed causes the stepping motor to lose steps and stop being driven.

As described above, according to one aspect of the present disclosure, the damage and deformation of components due to collision of the head attachment with the lift can be prevented when the head attachment is inclined.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge apparatus comprising:
- a liquid discharge head to discharge a liquid in a discharge direction;
- a head attachment onto which the liquid discharge head is attached;
- a lift to:
  - move the head attachment back and forth in the discharge direction; and
  - keep an orientation of the head attachment in a plane orthogonal to the discharge direction; and
- a contact projection on a side face of the head attachment,
- the contact projection facing the lift and having a space with the lift in a width direction orthogonal to the discharge direction, and
- the contact projection is contactable with the lift based on an inclination of the head attachment with respect to the plane,
- wherein the contact projection extends and covers at least a part of the side face of the head attachment in the discharge direction.

2. The liquid discharge apparatus according to claim 1,
- wherein the contact projection projects from the side face of the head attachment toward the lift in the width direction.

3. The liquid discharge apparatus according to claim 1,
- wherein the contact projection has a linear shape extending in the discharge direction.

4. The liquid discharge apparatus according to claim 1, further comprising:
- a holder holding the head attachment,
- wherein the contact projection projects from the side face of the head attachment toward the lift by a projecting amount, and
- the contact projection contacting the lift restricts deformation of the holder within an allowable range in response to the inclination of the head attachment with respect to the plane.

5. The liquid discharge apparatus according to claim 1, wherein:
- a center of the head attachment is located at a position different from a rotation center of inclination of the head attachment.

6. The liquid discharge apparatus according to claim 1, wherein;

a center of the head attachment is located at a same position as a rotation center of inclination of the head attachment.

7. The liquid discharge apparatus according to claim 1, wherein:

the contact projection includes a material to increase a friction coefficient.

8. The liquid discharge apparatus according to claim 7, wherein:

the material is a rubber material.

9. The liquid discharge apparatus according to claim 1, wherein:

a surface roughness of the contact projection is increased to increase a resistance force when the contact projection contacts the lift.

10. The liquid discharge apparatus according to claim 1, further comprising:

a head substrate and a head substrate cooler mounted in the head attachment, wherein the contact projection projects toward the lift relative to the head substrate and the head substrate cooler.

11. The liquid discharge apparatus according to claim 10, wherein:

the contact projection extends higher than the head substrate and the head substrate cooler.

12. The liquid discharge apparatus according to claim 1, wherein:

the contact projection covers an entire range of the side face of the head attachment in the discharge direction.

13. The liquid discharge apparatus according to claim 1, wherein:

the contact projection is disposed only on an upper end of the side face of the head attachment and a vicinity thereof.

14. The liquid discharge apparatus according to claim 1, wherein:

the contact projection is disposed only on a lower end of the side face of the head attachment and a vicinity thereof.

15. The liquid discharge apparatus according to claim 1, wherein:

the contact projection includes a first contact projection disposed at an upper end of the side face and a second contact projection disposed at a lower end of the side face.

16. A liquid discharge apparatus, according to claim 1, comprising:

a liquid discharge head to discharge a liquid in a discharge direction;

a head attachment onto which the liquid discharge head is attached;

a lift to:

move the head attachment back and forth in the discharge direction; and keep an orientation of the head attachment in a plane orthogonal to the discharge direction; and a contact projection on a side face of the head attachment, the contact projection facing the lift and having a space with the lift in a width direction orthogonal to the discharge direction, and the contact projection is contactable with the lift based on an inclination of the head attachment with respect to the plane, wherein:

the lift includes a stepping motor to move the head attachment back and forth in the discharge direction, and the contact projection contacting the lift causes the stepping motor to lose steps and stop being driven.

17. The liquid discharge apparatus according to claim 16, further comprising:

a head substrate and a head substrate cooler mounted in the head attachment, wherein the contact projection projects toward the lift relative to the head substrate and the head substrate cooler.

18. The liquid discharge apparatus according to claim 16, wherein:

the contact projection covers an entire range of the side face of the head attachment in the discharge direction.

19. The liquid discharge apparatus according to claim 16, wherein:

the contact projection has a linear shape extending in the discharge direction.

20. The liquid discharge apparatus according to claim 16, wherein:

the contact projection projects from the side face of the head attachment toward the lift in the width direction.

* * * * *